(12) United States Patent
Matsumura et al.

(10) Patent No.: US 8,476,325 B2
(45) Date of Patent: Jul. 2, 2013

(54) STYRENE-MODIFIED POLYETHYLENE-BASED RESIN BEADS, STYRENE-MODIFIED POLYETHYLENE-BASED EXPANDABLE RESIN BEADS, PRODUCTION METHOD THEREFOR, PRE-EXPANDED BEADS AND EXPANDED MOLDED ARTICLE

(75) Inventors: Hideyasu Matsumura, Shiga (JP); Tatsuya Matsugashita, Nara (JP)

(73) Assignee: Sekisui Plastics Co., Ltd., Osaka (JP)

( * ) Notice: Subject to any disclaimer, the term of this patent is extended or adjusted under 35 U.S.C. 154(b) by 1229 days.

(21) Appl. No.: 11/659,469

(22) PCT Filed: Aug. 19, 2005

(86) PCT No.: PCT/JP2005/015151
§ 371 (c)(1),
(2), (4) Date: Feb. 6, 2007

(87) PCT Pub. No.: WO2006/027943
PCT Pub. Date: Mar. 16, 2006

(65) Prior Publication Data
US 2007/0249784 A1    Oct. 25, 2007

(30) Foreign Application Priority Data
Sep. 3, 2004  (JP) .................................. 2004-257154

(51) Int. Cl.
*C08J 9/16*    (2006.01)
*C08J 9/18*    (2006.01)
*B22C 1/22*    (2006.01)
*B29C 44/34*   (2006.01)

(52) U.S. Cl.
USPC ............... 521/56; 521/59; 521/60; 521/139; 521/142

(58) Field of Classification Search
USPC .................... 525/333.7; 521/56, 59, 60, 139, 521/142
See application file for complete search history.

(56) References Cited

U.S. PATENT DOCUMENTS

| 3,959,189 | A | 5/1976 | Kitamori | |
|---|---|---|---|---|
| 2004/0152795 | A1* | 8/2004 | Arch et al. | .................... 521/56 |
| 2006/0058406 | A1 | 3/2006 | Matsumura et al. | |
| 2006/0063847 | A1 | 3/2006 | Matsumura et al. | |
| 2007/0243365 | A1 | 10/2007 | Matsumura et al. | |

FOREIGN PATENT DOCUMENTS

| EP | 1659145 | 5/2006 |
|---|---|---|
| EP | 1803752 | 7/2007 |
| JP | 51-046138 | 12/1976 |
| JP | 52-010150 | 3/1977 |
| JP | 58-053003 | 11/1983 |
| JP | 62-059642 | 3/1987 |
| JP | 2-284905 | 11/1990 |
| JP | 02284905 | * 11/1990 |
| JP | 3-273014 | 12/1991 |
| JP | 4-183706 | 6/1992 |
| JP | 04183706 | * 6/1992 |
| JP | 08-059754 | * 3/1996 |
| JP | 8-059754 | 3/1996 |
| JP | 08059754 | * 3/1996 |
| JP | 2000-302953 | * 10/2000 |
| JP | 2005-097555 | 4/2005 |
| JP | 2005097555 | * 4/2005 |
| JP | 2005-281595 | 10/2005 |

OTHER PUBLICATIONS

English Language Abstract of JP 8-059754.
English Language Abstract of JP 4-183706.
English Language Abstract of JP 3-273014.
English Language Abstract of JP 2-284905.
English Language Abstract of JP 2005-281595.
English Language Abstract of JP 2005-097555.
English Language Abstract of JP 58-053003.
English Language Abstract of JP 62-059642.
U.S. Appl. No. 11/659,466 (Matsumura et al.), filed Feb. 6, 2007 and entitled, "Styrene-Modified Linear Low-Density Polyethylene-Resin Beads, Styrene-Modified Linear Low-Density Polyethylene-Based Expandable Resin Beads, Production Method therefore, Pre-Expanded Beads and Expanded Molded Article".
U.S. Appl. No. 11/659,463 (Matsumura et al.), filed Feb. 6, 2007 and entitled, "Expanded Molded Article Having Voids".
Extended European Search Report for European Application No. 05772816.4.

* cited by examiner

*Primary Examiner* — Ling Choi
*Assistant Examiner* — Monique Peets
(74) *Attorney, Agent, or Firm* — Greenblum & Bernstein, P.L.C.

(57) ABSTRACT

A method for producing styrene-modified polyethylene-based resin beads, including the steps of: dispersing 100 parts by weight of polyethylene-based resin beads which contain an inorganic nucleating agent and have a melting point of 95° C. to 115° C., 20 parts by weight or more and less than 300 parts by weight of a styrene-based monomer and a polymerization initiator into an aqueous suspension containing a dispersant; impregnating the polyethylene-based resin beads with the styrene-based monomer under heating the resulting dispersion at such a temperature that the styrene-based monomer does not substantially polymerize; and performing polymerization of the styrene-based monomer at a temperature of (T)° C. to (T+25)° C. (where T° C. is a melting point of the polyethylene-based resin beads.)

5 Claims, 17 Drawing Sheets

STYRENE-MODIFIED POLYETHYLENE-BASED RESIN BEADS, STYRENE-MODIFIED POLYETHYLENE-BASED EXPANDABLE RESIN BEADS, PRODUCTION METHOD THEREFOR, PRE-EXPANDED BEADS AND EXPANDED MOLDED ARTICLE

TECHNICAL FIELD

The present invention relates to styrene-modified polyethylene-based resin beads, styrene-modified polyethylene-based expandable resin beads, production method therefor, pre-expanded beads and an expanded molded article.

BACKGROUND ART

A polyethylene-based resin foam is generally used as a packing material owing to its high elasticity and excellent oil and impact resistance. The polyethylene-based resin foam, however, has weakness that its stiffness and compressive strength are low. On the other hand, a styrene-based resin foam is excellent in stiffness, but has a weakness that it is brittle.

To overcome such weakness, Japanese Examined Patent Publication No. SHO 51(1976)-46138 (Patent Document 1), Japanese Examined Patent Publication No. SHO 52(1977)-10150 (Patent Document 2), Japanese Examined Patent Publication No. SHO 58(1983)-53003 (Patent Document 3) and Japanese Unexamined Patent Publication No. SHO 62(1987)-59642 (Patent Document 4) disclose methods in which polyethylene-based resin is impregnated with a styrene-based monomer and polymerization is performed to obtain styrene-modified polyethylene-based expandable resin beads.

[Patent Document 1] Japanese Examined Patent Publication No. SHO 51(1976)-46138
[Patent Document 2] Japanese Examined Patent Publication No. SHO 52(1977)-10150
[Patent Document 3] Japanese Examined Patent Publication No. SHO 58(1983)-53003
[Patent Document 4] Japanese Unexamined Patent Publication No. SHO 62(1987)-59642

DISCLOSURE OF INVENTION

Problems that the Invention is to Solve

In these methods, an inorganic nucleating agent is not used in the polyethylene-based resin. This makes it difficult to disperse styrene-based resin in particulate form in the polyethylene-based resin near surface regions of the obtained modified resin beads, and thereby the beads tend to show insufficient chemical resistance. Even if the inorganic nucleating agent is used in the polyethylene-based resin, it has been found that the styrene-based resin dispersed in the polyethylene-based resin takes a form of particles having a size greater than 1 μm near the surface regions of the beads, and thereby the beads tend to show insufficient chemical resistance, because the polymerization of the styrene-based monomer is usually carried out at around 90° C.

Though expanded molded articles formed with modified resin beads prepared by such conventionally known methods are adequate in compressive strength, they are inadequate in impact resistance.

Means of Solving the Problems

As a result of an intensive study to solve the above problems, the inventors of the present invention found that employing polyethylene-based resin beads having a specific melting point and adding a styrene-based monomer to beads of this resin, followed by polymerization at a specific temperature would provide styrene-modified polyethylene-based resin beads from which the expanded molded article that sufficiently exhibit the impact resistance of polyethylene-based resin and the stiffness of styrene-based resin can be made, and thus achieved the present invention.

According to one aspect of the invention, there is provided a method for producing styrene-modified polyethylene-based resin beads, comprising the steps of: dispersing 100 parts by weight of polyethylene-based resin beads which contain an inorganic nucleating agent and have a melting point of 95° C. to 115° C., 20 parts by weight or more and less than 300 parts by weight of a styrene-based monomer and a polymerization initiator into an aqueous suspension containing a dispersant; impregnating the polyethylene-based resin beads with the styrene-based monomer, under heating the resulting dispersion at such a temperature that the styrene-based monomer does not substantially polymerize; and performing polymerization of the styrene-based monomer at a temperature of (T)° C. to (T+25)° C. (where T° C. is a melting point of the polyethylene-based resin beads).

According to another aspect of the invention, there is provided a method for producing styrene-modified polyethylene-based resin beads, comprising the steps of: dispersing 100 parts by weight of polyethylene-based resin beads which contain an inorganic nucleating agent and have a melting point of 95° C. to 115° C., 20 parts by weight to 200 parts by weight of a styrene-based monomer and a polymerization initiator into an aqueous suspension containing a dispersant; impregnating the polyethylene-based resin beads with the styrene-based monomer, under heating the resulting dispersion at such a temperature that the styrene-based monomer does not substantially polymerize; performing first polymerization of the styrene-based monomer at a temperature of (T)° C. to (T+25)° C. (where T° C. is a melting point of the polyethylene-based resin beads); and subsequent to the first polymerization, adding a styrene-based monomer and a polymerization initiator and adjusting the temperature of the resulting dispersion to (T)° C. to (T+25)° C. (where T° C. is a melting point of the polyethylene-based resin beads), so that impregnation of the polyethylene-based resin beads with the styrene-based monomer and second polymerization take place, wherein the total amount of the styrene-based monomers used in the first and second polymerization is 30 parts by weight or more and less than 300 parts by weight relative to 100 parts by weight of the polyethylene-based resin beads.

Furthermore, the present invention provides styrene-modified polyethylene-based resin beads, comprising 20 parts by-weight or more and less than 300 parts by weight of styrene-based resin relative to 100 parts by weight of polyethylene-based resin which contains an inorganic nucleating agent and has a melting point of 95° C. to 115° C., wherein styrene-based resin is dispersed a form of particles in a bead, and the particle diameter is 0.8 μm or smaller in a surface region within at least 5 μm from the bead surface and also in the bead center region.

Still further, the present invention provides styrene-modified polyethylene-based expandable resin beads, comprising a volatile blowing agent and 20 parts by weight or more and less than 300 parts by weight of styrene-based resin relative to 100 parts by weight of polyethylene-based resin which contains an inorganic nucleating agent and has a melting point of 95° C. to 115° C., wherein styrene-based resin is dispersed a form of particles in a bead, and the particle diameter is 0.8 μm or smaller in a surface region within at least 5 μm from the bead surface and also in the bead center region.

In accordance with the present invention, provided are pre-expanded beads having a bulk density of 10 to 300 kg/m³ obtained by pre-expanding the above-mentioned styrene-modified polyethylene-based expandable resin beads.

In accordance with the present invention, also provided is an expanded molded article having a density of 10 to 300 kg/m³ obtained by expansion molding of the above-mentioned pre-expanded beads.

Effect of the Invention

According to a production method of the present invention, the step of impregnating the polyethylene-based resin beads, which contain the inorganic nucleating agent and have a specific melting point, with the styrene-based monomer is carried out at a specific temperature range under the presence of the polymerization initiator. This allows the styrene-based resin to be dispersed in the form of particles having a specific size in the polyethylene-based resin beads, and thereby providing the styrene-modified polyethylene-based resin beads and the styrene-modified polyethylene-based expandable resin beads from which the expanded molded article having high physical properties can be obtained.

BEST MODE FOR CARRYING OUT THE INVENTION

Figure 1:
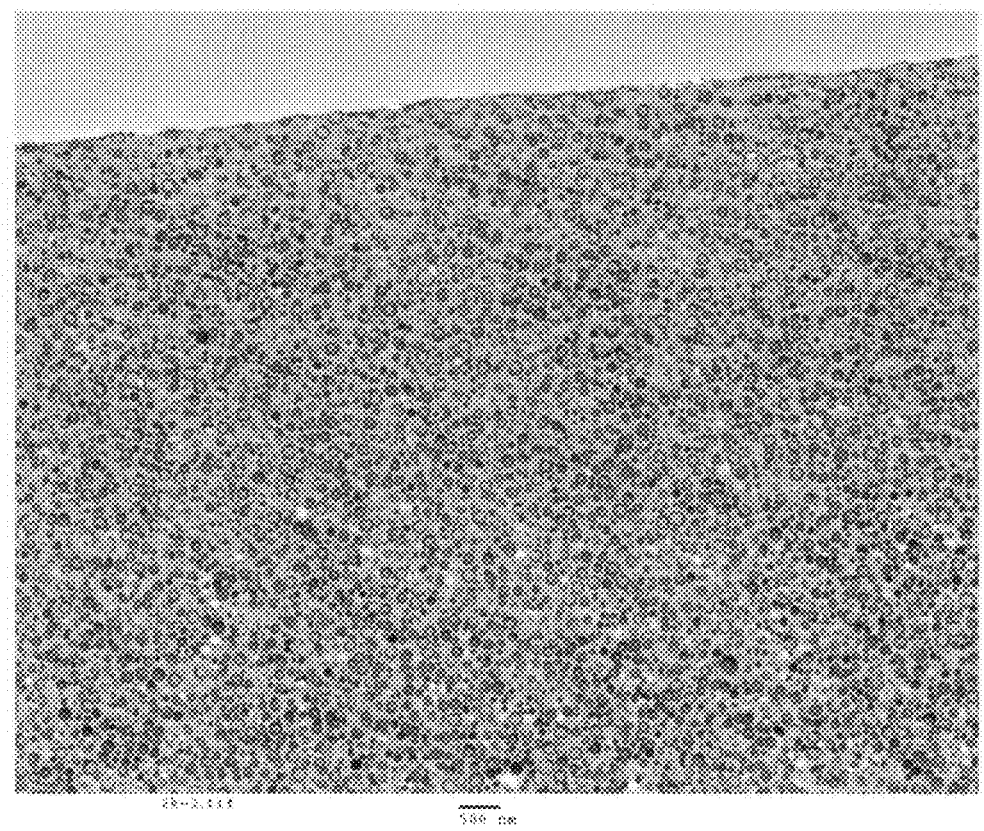
FIG. 1 is a TEM picture showing a surface region cross-section of a modified resin bead according to Example 1 of the present invention.

Styrene-modified polyethylene-resin beads (hereinafter referred to as modified resin beads) obtained by the production method of the present invention are beads made of base resin containing styrene-based resin in which polyethylene-based resin beads containing an inorganic nucleating agent is impregnated with a styrene-based monomer and the monomer is polymerized. Furthermore, styrene-modified polyethylene-based expandable resin beads (hereinafter referred to as expandable beads) are beads in which a volatile blowing agent is contained in the base resin.

The polyethylene-based resin is not particularly limited as long as it has a melting point of 95° C. to 115° C., and resins that are obtained by known polymerization methods can be used. The polyethylene-based resin may be crosslinked. Particularly, branched low-density polyethylene and an ethylene/vinyl acetate copolymer are preferred. The low-density polyethylene preferably has a density of 0.91 g/cm³ to 0.94 g/cm³ and more preferably a density of 0.91 g/cm³ to 0.93 g/cm³.

As the inorganic nucleating agent, for example, talc, silicon dioxide, mica, clay, zeolite, calcium carbonate or the like can be used.

The amount of the inorganic nucleating agent used is preferably 0.1 to 2 parts by weight and more preferably 0.2 to 1.5 parts by weight relative to 100 parts by weight of the polyethylene-based resin. An amount less than 0.1 parts by weight is not preferred because the number of styrene-based resin particles dispersed in the polyethylene-based resin would lessen and the size of the particles would tend to increase, exceeding 1 μm. An amount more than 2 parts by weight is not preferred because the expanded molded article would be brittle and the strength would tend to decrease.

Furthermore, additives such as a coloring material (colorant), a fire retardant, an antioxidant, an ultraviolet absorber and the like may be contained in the polyethylene-based resin beads upon necessity.

As the coloring material, both inorganic and organic coloring materials can be used. Particularly, inorganic coloring materials such as iron oxide, carbon black and the like are preferred.

As the iron oxide, there can be used α-FeOOH (water-containing crystal) as iron oxide yellow, α-$Fe_2O_3$ as iron oxide red, $(FeO)x(Fe_2O_3)y$ as iron oxide black or the like. These iron oxides may have another metal such as Zn, Mg or the like substituting for a part of Fe. Furthermore, the iron oxides may be mixed to obtain a desired color. Among the above iron oxides, $Fe_3O_4$ included in iron oxide black, $(FeO)x(Fe_2O_3)y$, is preferred.

The iron-oxide preferably has an average particle diameter of 0.1 μm to 1 μm, and more preferably an average particle diameter of 0.2 μm to 0.8 μm. The average particle diameter can be measured with a laser diffraction particle size analyzer (RODOS manufactured by JEOL Ltd.)

The polyethylene-based resin beads contain the iron oxide preferably in the range of 1.5 wt % to 70 wt %, more preferably in the range of 5 wt % to 40 wt %, and still more preferably in the range of 10 wt % to 30 wt %. An amount less than 1.5 wt % is not preferred because the polyethylene-based resin beads may not be adequately colored. An amount more than 70 wt % is not preferred because it would be difficult to mix the iron oxide with the polyethylene-based resin beads. Furthermore, because the specific gravity of the iron oxide is greater than that of the polyethylene-based resin, an amount more than 70 wt % would increase the weight of the resin beads and the resin beads would not be uniformly impregnated with the styrene-based monomer.

As the carbon black, furnace black, channel black, thermal black, acetylene black, graphite, carbon fiber or the like can be used.

The polyethylene-based resin beads contain the carbon black preferably in the range of 1 wt % to 50 wt %, and more preferably in the range of 2 wt % to 30 wt %. An amount less than 1 wt % is not preferred because the polyethylene-based resin beads may not be adequately colored. An amount more than 50 wt % is not preferred because it would be difficult to mix the carbon black with the polyethylene-based resin beads.

Examples of the styrene-based resin include those of styrene-based monomer-origin such as styrene, α-methyl styrene, p-methyl styrene, t-butyl styrene and the like. Furthermore, the styrene-based resin may be a copolymer of a styrene-based monomer and another monomer that can be copolymerized with the styrene-based monomer. Examples of another monomer that can be copolymerized with the styrene-based monomer include polyfunctional monomers such as divinylbenzene, alkyl (meta) acrylic esters which do not include a benzene ring in their structure such as butyl (meta) acrylate, and the like. These monomers may be used substantially in the range not exceeding 5 wt % relative to the styrene-based resin.

The amount of styrene-based resin is 20 parts by weight or more and less than 300 parts by weight, and preferably 30 to 280 parts by weight relative to 100 parts by weight of the polyethylene-based resin. An amount less than 20 parts by weight is not preferred because it would be difficult to uniformly disperse the styrene-based resin particles. An amount of 300 parts by weight or more is not preferred because the styrene-based resin particles in a center region would tend to coalesce partly and become large particles, whereby the strength cannot be significantly improved.

In the case of expandable beads, an amount of styrene-based resin less than 20 parts by weight makes the retention of the volatile blowing agent extremely poor, rendering it difficult to achieve low density. This also renders the expansion molding more difficult.

As the volatile blowing agent, for example, hydrocarbons such as propane, n-butane, isobutane, pentane, isopentane, cylcopentane, hexane and the like can be used alone or two or more of these hydrocarbons can be used in combination.

The content of the blowing agent is preferably 5 to 20 parts by weight relative to 100 parts by weight of resin that makes up the expandable beads (the sum of the polyethylene-based resin and the styrene-based resin).

Preferably, the modified resin beads and the expandable beads each have a cylindrical, spherical or substantially spherical shape with a L/D (where L is a length of the bead and D is a mean diameter of the bead) of 0.6 to 1.6. The average size of the beads is preferably 0.3 mm to 3.0 mm.

The beads having a L/D smaller than 0.6 or greater than 1.6, that is, the beads having high ovality are not preferred because it would be difficult to fill pre-expanded beads obtained from such modified resin beads and expandable beads into a mold when forming an expanded molded article.

The shape of the beads preferably is spherical or substantially spherical so as to make the filling easier.

An average bead size smaller than 0.3 mm is not preferred because the retention of the blowing agent would decrease and the reduction in density would tend to be difficult. An average bead size greater than 3.0 mm is not preferred because not only the filling into a mold would be difficult, but thinning of an expanded molded article would also be difficult.

According to the present invention, there can be provided the modified resin beads and expandable beads. Each of these beads, when seen in cross-section, has the styrene-based resin dispersed in the form of particles of a predetermined size in the polyethylene-based resin as described below.

In other words, each of the beads has the styrene-based resin dispersed in the form of particles having a diameter of 0.8 µm or smaller in the polyethylene-based resin in a surface region within at least 5 µm from the surface of the bead. The lower limit for the particle diameter of the styrene-based resin in particulate form (hereinafter referred to as styrene-based resin particles) is about 0.01 µm. Where the particle diameter of the styrene-based resin particles in the surface region exceeds 0.8 µm, it incurs a reduction in chemical resistance. Thus, the diameter of styrene-based resin particles in the surface region of each bead is preferably 0.01 µm to 0.8 µm, more preferably 0.01 µm to 0.6 µm, and still more preferably 0.05 µm to 0.25 µm.

Also in the center region within about a 5 µm radius from the center of the bead, the styrene-based resin is dispersed in the form of particles having a diameter of 0.8 µm or smaller in the polyethylene-based resin. The lower limit for the diameter of the styrene-based resin particles is about 0.01 µm. Where the diameter of the styrene-based resin particles in the center region exceeds 0.8 µm, it incurs a reduction in impact resistance. Thus, the diameter of styrene-based resin particles in the modified resin beads and expandable beads is preferably 0.01 µm to 0.8 µm, and more preferably 0.1 µm to Next, a production method of the modified resin beads and expandable beads according to the present invention will be described.

In an aqueous suspension containing a dispersant, 100 parts by weight of polyethylene-based resin beads containing an inorganic nucleating agent, 20 parts by weight or more and less than 300 parts by weight of a styrene-based monomer and a polymerization initiator are dispersed.

As an aqueous medium that makes up the aqueous suspension, there can be used water or a mixed medium of water and a water-soluble solvent (for example, lower alcohol).

The dispersant is not particularly-limited, and any of the known dispersants can be used. More specifically, there can be used slightly soluble inorganic substances such as calcium phosphate, magnesium pyrophosphate, sodium pyrophosphate, magnesium oxide and the like. Furthermore, a surface-active agent such as sodium dodecylbenzene-sulfonate may be used.

The polyethylene-based resin beads can be obtained by known methods. For example, there is a method in which polyethylene-based resin together with an additive, if necessary, is melted and kneaded in an extruder and then extruded from the extruder to obtain a strand. Then, the obtained strand is cut in the air or in the water or cut while being heated to granulate the strand.

Preferably, the polyethylene-based resin beads each have a cylindrical, spherical or substantially spherical shape with an L/D (where L is a length of the bead and D is a mean diameter of the bead) of 0.6 to 1.6. The average size of the beads is preferably 0.2 mm to 1.5 mm. The beads having a L/D smaller than 0.6 or greater than 1.6, that is, the beads having high ovality are not preferred because it would be difficult to fill pre-expanded beads obtained from expandable beads into a mold when forming an expanded molded article. The shape of the beads is preferably spherical or substantially spherical so as to make the filling easier. An average bead size smaller than 0.2 mm is not preferred because the retention of the blowing agent would decrease and the reduction in density would tend to be difficult. An average bead size greater than 1.5 mm is not preferred because not only the filling into a mold would be difficult, but thinning of an expanded molded article would also be difficult.

As the polymerization initiator, those typically used as a polymerization initiator for suspension polymerization of a styrene-based monomer can be used. Examples thereof include organic peroxides such as benzoyl peroxide, di-t-butyl peroxides, t-butylperoxy benzoate, dicumyl peroxide, 2,5-dimethyl-2,5-di-t-butylperoxy hexane, t-butylperoxy-3,5,5-trimethyl hexanoate, t-butyl-peroxy-2-ethylhexyl carbonate and the like. These initiators may be used alone or two or more of these may be used in combination.

The amount of the initiator used is preferably 0.1 to 0.9 parts by weight and more preferably 0.2 to 0.5 parts by weight relative to 100 parts by weight of the styrene-based monomer. An amount less than 0.1 parts by weight is not preferred because too much time would be required for the polymerization of the styrene-based monomer. An amount more than 0.9 parts by weight is not preferred because it would decrease the molecular weight of the styrene-based resin.

In order to achieve excellent properties, the molecular weight of the styrene-based resin is preferably about two hundred thousands to about five hundred thousands. However, where more than 0.9 parts by weight of the initiator is used, there may be a case where only a molecular weight smaller than the above-mentioned range can be obtained.

Next, the resulting dispersion is heated to such a temperature that the styrene-based monomer does not substantially polymerize to impregnate the polyethylene-based resin beads with the styrene-based monomer.

The time appropriate for sufficiently impregnating the inside of the polyethylene-based resin beads with the styrene-based monomer is 30 minutes to 2 hours. In this range, generation of polymer powder of the styrene-based resin due to polymerization taking place before the beads are sufficiently impregnated with the monomer is prevented. It is advantageous that the temperature at which the monomer does not substantially polymerize is as high as possible to accelerate the impregnation rate, but it needs to be determined with consideration giver to the decomposition temperature of the initiator.

Next, polymerization of the styrene-based monomer is carried but at a temperature of $(T)°$ C. to $(T+25)°$ C. where $(T)°$ C. is the melting point of the polyethylene-based resin beads.

A polymerization temperature lower than $(T)°$ C. is not preferred because the styrene-based resin would not be dispersed in the form of particles with a size of 0.8 μm or smaller near the surface regions of modified resin beads. Furthermore, a polymerization temperature greater than $(T+25)°$ C. is not preferred because aggregated particles in which particles coalesce would be generated.

Depending on the type of the initiator used, the initiator might function as a crosslinking agent for the polyethylene-based resin rather than as the initiator for the polymerization of the styrene-based monomer at a temperature higher than 140° C., for example. For this reason, it is not preferable to perform the polymerization at excessively high temperatures.

Since the polyethylene-based resin beads have a melting point of 95° C. or higher, the polymerization is performed at 95° C. or higher. For this reason, it is preferable that the polymerization take place in a pressurizable closed vessel.

With the above steps, the modified resin beads can be obtained. The expandable beads can be obtained by impregnating the modified resin beads during or after the polymerization with the volatile blowing agent. The impregnation can be carried out by per se known methods. For example, the impregnation during the polymerization can be carried out by making polymerization reaction to occur in a closed vessel and injecting the volatile blowing agent into the vessel. The impregnation after the polymerization can be carried out by injecting the volatile blowing agent into a closed vessel.

Thus, the modified resin beads and expandable beads having excellent characteristics can be provided by the above-mentioned methods. However, where the amount of styrene-based monomer is too much, polymer powder of the styrene-based resin tends to increase in amount.

When one wishes to carry out the impregnation and polymerization with a greater amount of styrene-based monomer, it is preferable that the polyethylene-based resin beads are impregnated with the styrene-based monomer in two separate steps as described below in order to reduce the generation of polymer powder.

In an aqueous suspension containing a dispersant, 100 parts by weight of polyethylene-based resin beads containing an inorganic nucleating agent, 20 to 200 parts by weight of a styrene-based monomer and a polymerization initiator are dispersed. Here, the styrene-based monomer and the initiator may be mixed in advance.

Then, the resulting dispersion is heated to such a temperature that the styrene-based monomer does not substantially polymerize to impregnate the polyethylene-based resin beads with the styrene-based monomer.

Subsequently, first polymerization of the styrene-based monomer is carried out at a temperature of $(T)°$ C. to $(T+25)°$ C. where $T°$ C. is the melting point of the polyethylene-based resin beads.

Next, a styrene-based monomer and a polymerization initiator are added to the reaction solution of the first polymerization, and the temperature is adjusted to $(T)°$ C. to $(T+25)°$ C. where $T°$ C. is the melting point of the polyethylene-based resin-beads, so that impregnation of the polyethylene-based resin beads with the styrene-based monomer and second polymerization take place.

The total amount of the styrene-based monomers used in the first and second polymerization is 30 parts by weight or more and less than 300 parts by weight relative to 100 parts by weight of the polyethylene-based resin beads.

The addition of the styrene-based monomer for the second polymerization may be after the completion of the first polymerization or during the first polymerization.

The second addition of the styrene-based monomer and the initiator may be continuous or intermittent. In order to prevent the generation of polymer powder, it is preferable that the impregnation of the inside of the polyethylene-based resin beads and the polymerization take place at approximately the same time. Because the polymerization is carried out at a relatively high temperature, a too high addition rate is not preferred. If the addition rate is too high, the polymerization would proceed before the impregnation takes place. An extremely slow addition rate is not preferred because it would hinder the polymerization. For example, the addition rate is preferably 30 to 100 parts by weight/hour.

With the above steps, the modified resin beads can be obtained. The expandable beads can be obtained as described above by impregnating the resin beads during or after the polymerization with the volatile blowing agent.

The expandable beads can be formed into pre-expanded beads by pre-expanding the expandable beads to a predetermined bulk density (for example, 10 to 300 kg/m$^3$) by known methods. The method of measuring the bulk density will be described in Examples.

Furthermore, an expanded molded article can be provided by filling the pre-expanded beads into a mold of a foam molding machine, and while heating again to expand the pre-expanded beads, heat fusing the expanded beads.

Steam is suitably used as a medium for heating. The expanded molded article preferably has a density of 10 to 300 kg/m$^3$. A density lower than 10 kg/m$^3$ is not preferred because it would be difficult to achieve sufficient strength. A density higher than 300 kg/m$^3$ is not preferred because a reduction in weight cannot be achieved and elasticity, which is one of the characteristics of the polyethylene-based resin expanded molded article, may not be sufficiently exhibited.

The obtained expanded molded article is strong and excellent in chemical and impact resistance. Since the molded article is modified with the styrene-based resin, it also has high stiffness.

The expanded molded article according to the present invention can be used for various purposes, and is particularly suitable for use in interior of cars, energy absorbing material inserted inside bumpers, packing material for heavy products, and the like.

EXAMPLES

The present invention will hereinafter be described by way of examples thereof. It should be understood that the invention be not limited to these examples. The measurement methods of bulk density, fusion rate, compressive strength, impact resistance, chemical resistance and density adopted in the following Examples and Comparative Examples will also be described below.

[Bulk Density]

The measurement of the bulk density of pre-expanded beads is carried out according to a method described in JIS K 6911:1995 "Testing methods for thermosetting plastics". More, specifically, pre-expanded beads are. allowed to free fall into a graduated cylinder by a standard bulk density measuring instrument and its weight is measured. The bulk density is determined from the following equation.

bulk density(kg/m$^3$)=pre-expanded beads weight(kg)/ pre-expanded beads volume in graduated cylinder(m$^3$)

[Fusion Rate]

In a surface of a flat-shaped expanded molded article having a size of 400 mm length×300 mm width×30 mm thickness, an about 5-mm depth line is cut with a cutter along a straight line that connects the centers of a pair of long sides. Then, the molded article is split into halves by hands along the cut line. The expanded beads in the split surface of the half of the molded article are counted with respect to the number (a) of expanded beads that are broken inside the beads and the number (b) of expanded beads that are broken at the boundary of the beads. The numbers (a) and (b) are substituted into an equation: (a)/[(a)+(b)]×100 and the obtained value is defined as the fusion rate (%).

[Compressive Strength]

The compressive strength is measured by a method described in JIS A9511:1995 "Prefoamed cellular plastics thermal insulation materials". More specifically, an expanded molded article having a size of 50 mm×50 mm×50 mm is used as a sample and the compressive strength thereof is measured when it is compressed by 5% at a compressive rate of 10 mm/min. using a universal testing machine Tensilon UCT-10T (manufactured by Orientech Co., Ltd.)

[Impact Resistance]

A flat, rectangular sample having a size of 215 mm length× 40 mm width×20 mm thickness is cut from the expanded molded article. In accordance with JIS K7211, the sample is then placed between a pair of holding members arranged at a distance of 150 mm. A steel ball weighing 321 g is dropped on the sample to calculate the falling ball impact value; that is, 50% breaking height based on the following equation. The maximum height from which the ball is dropped is set to 120 cm.

$$50\% \text{ breaking height } H_{50}=Hi+d[\Sigma(i\times ni)/N\pm 0.5]$$

wherein $H_{50}$: 50% breaking height (cm)

Hi: the height (cm) of the ball when the height level (i) is 0 and also the height that is expected to break the sample d: the distance (cm) between the heights of the ball when it is vertically moved i: the height level with an increase/decrease by one when Hi is 0 (i= . . . −3, −2, −1, 0, 1, 2, 3 . . . )

ni: the number of samples broken (or unbroken) at each level

N: the total number (N=Σni) of samples broken (or unbroken)

Data on either broken or unbroken samples with a larger number is employed. Where the numbers of the broken and unbroken samples are the same, either one can be employed.

±0.5: the negative is taken when data on the broken samples is used and the positive is taken when data on the unbroken samples is used.

[Chemical Resistance]

Three pieces of plate-like samples having a flat. rectangular shape and a size of 100 mm length×100 mm width×20 mm thickness are cut from the expanded molded article. The samples are left standing at 23° C. and a 50% humidity for 24 hours. The samples are cut from the expanded molded article so that the upper surface of each sample is entirely formed of the surface of the molded article.

Then, 1 g of various chemicals (gasoline, kerosene, dibutylphthalate (DBP)) are respectively applied to the upper surfaces of the three samples and the samples are left standing at 23° C. and a 50% humidity for 60 minutes. Subsequently, the chemicals are wiped off the upper surfaces of the samples and the upper surfaces of the samples are visually observed to make assessments according to the following ratings.

◯: fine, no changes

Δ: slightly bad, surface softens

×: bad, surface cave in (shrinks)

[Measurement of Expanded Molded Article Density]

The density of the expanded molded article is measured by a method described in JIS A 9511:1995 "Prefoamed cellular plastics thermal insulation materials".

Example 1

100 parts by weight of low-density polyethylene-based resin (hereinafter referred to as LDPE, manufactured by Nippon Unicar Company Limited, tradename: DFDJ-6775, melting point: 112° C., melt flow rate: 0.2g/10 min., density: 0.92 g/cm$^3$) and 0.5 parts by weight of water-containing synthetic silicon dioxide were fed into an extruder. The feedstock was melted and kneaded, and then granulated by under water cut system to provide oval (egg-shaped) LDPE resin beads (polyolefin-based resin beads). The average weight of the LDPE resin beads was 0.6 mg. The melt flow rate and the density of the LDPE resin beads were measured according to JIS k6992-2.

Then, 0.8 parts by weight of magnesium pyrophosphate and 0.02 parts by weight of sodium dodecylbenzenesulfonate were dispersed in 100 parts by weight of water to obtain a medium for dispersion.

In the dispersion medium, 100.5 parts by weight of the synthetic silicon dioxide-containing LDPE resin beads were dispersed to obtain a suspension.

Furthermore, 0.19 parts by weight of dicumyl peroxide as a polymerization initiator was dissolved in advance in 30 parts by weight of a styrene monomer.

The temperature of the water-based medium containing the LDPE resin beads was adjusted to 60° C. and the styrene monomer was added quantitatively to the medium over 30 min. Then, the resulting mixture was stirred for an hour to impregnate the LDPE resin beads with the styrene monomer.

Next, the temperature of the reaction system was raised to 130° C. which is higher than the melting point of LDPE by 18° C. and kept for 2 hours to polymerize the styrene monomer in the LDPE resin beads.

Figure 2:
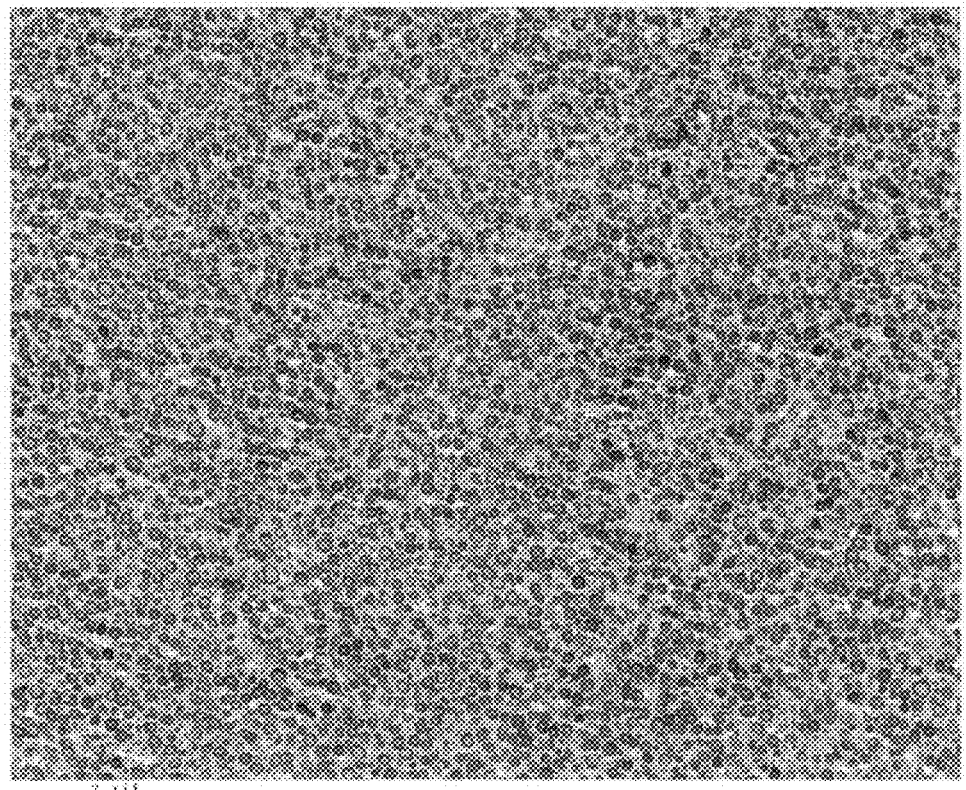
FIG. 2 is a TEM picture showing a center region cross-section of the modified resin bead according to Example 1 of the present invention.

The dispersion state of styrene resin in the obtained modified resin beads was observed by a TEM (×12800). The styrene resin particles with a particle diameter of 0.05 µm to 0.2 µm were dispersed in a surface region (an area within about 5 µm from the surface) and the styrene resin particles with a particle diameter of 0.1 µm to 0.25 µm were dispersed in a center region (an area within about a 5 µm radius from the center). The cross-sectional pictures of the surface region and the center region are shown in FIG. 1 and FIG. 2, respectively.

Subsequently, 100 parts by weight of the modified resin beads, 1.0 parts by weight of water, 0.15 parts by weight of monoglyceride stearate and 0.5 parts by weight of diisobutyl adipate were fed into a pressure-resistant V-type rotary mixer having a volume of 1 m$^3$ and 14 parts by weight of butane (n-butane: i-butane=7:3) was injected at a normal temperature while the mixer was rotated. After the temperature inside the rotary mixer was raised to 70° C. and kept for 4 hours, it was cooled to 25° C. to obtain expandable beads. The obtained expandable beads had styrene resin particles with a particle diameter of 0.05 µm to 0.2 µm dispersed in a surface region and styrene resin particles with a particle diameter of 0.1 µm to 0.25 µm dispersed in a center region as in the case of the above-mentioned modified resin beads.

The obtained expandable beads were immediately fed into a pre-expanding machine (trade name SKK-70 manufactured by Sekisui Machinery Co., Ltd.) and steam were used at a pressure of 0.02 MPa to pre-expand the beads. Pre-expanded beads having a bulk density of 60 kg/m$^3$ were obtained.

Then, the pre-expanded beads were left standing at a room temperature for 7 days and then filled into a mold of a molding machine (trade name ACE-3SP manufactured by Sekisui Machinery Co., Ltd.) Steam was introduced into the mold to expand and mold the pre-expanded beads. A rectangular parallelepiped expanded molded article having a size of 400 mm length×300 mm width×50 mm height and a density of 60 kg/m$^3$ was made. The fusion rate, compressive strength, and impact and chemical resistance of the obtained molded article were measured. The results are shown in Table 1.

Example 2

Modified resin beads were obtained in the same manner as in Example 1 except that an ethylene/vinyl acetate copolymer (hereinafter referred to as EVA, manufactured by Nippon Unicar Company Limited, tradename: NUC-3221, vinyl acetate content: 5 wt %, melting point: 107° C., melt flow rate: 0.2 g/10 min., density: 0.92 g/cm$^3$) was used as the polyethylene-based resin instead of the LDPE and the amount of styrene monomer added was 110 parts by weight.

Figure 3:
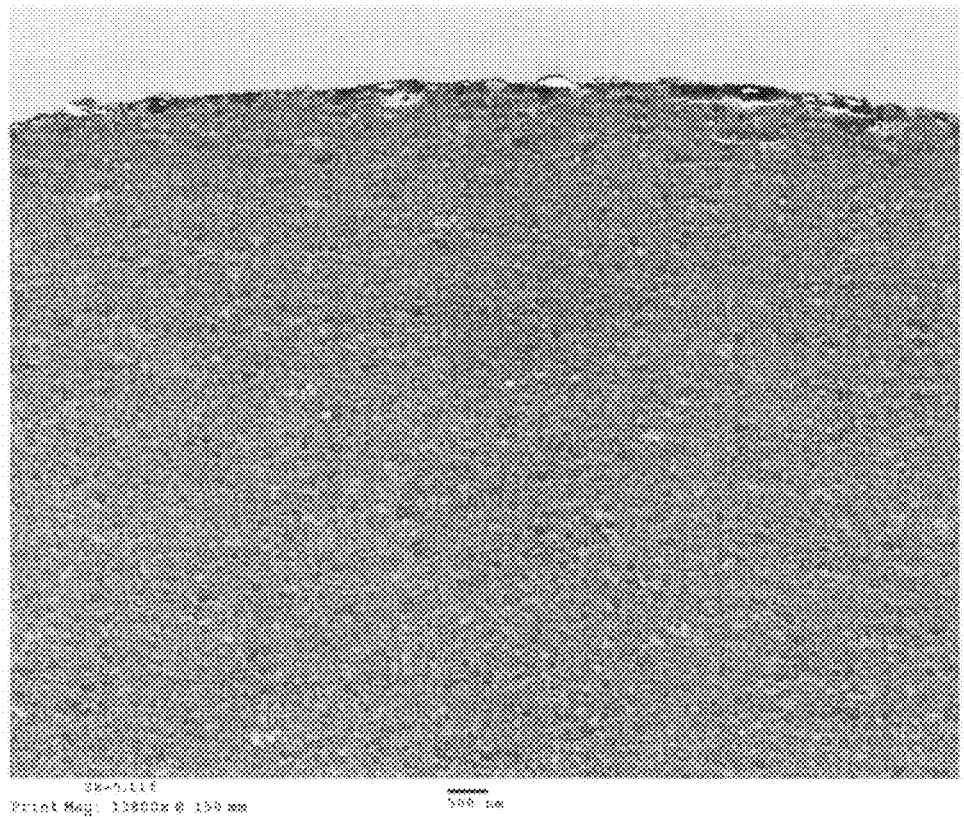
FIG. 3 is a TEM picture showing a surface region cross-section of a modified resin bead according to Example 2 of the present invention.
Figure 4:
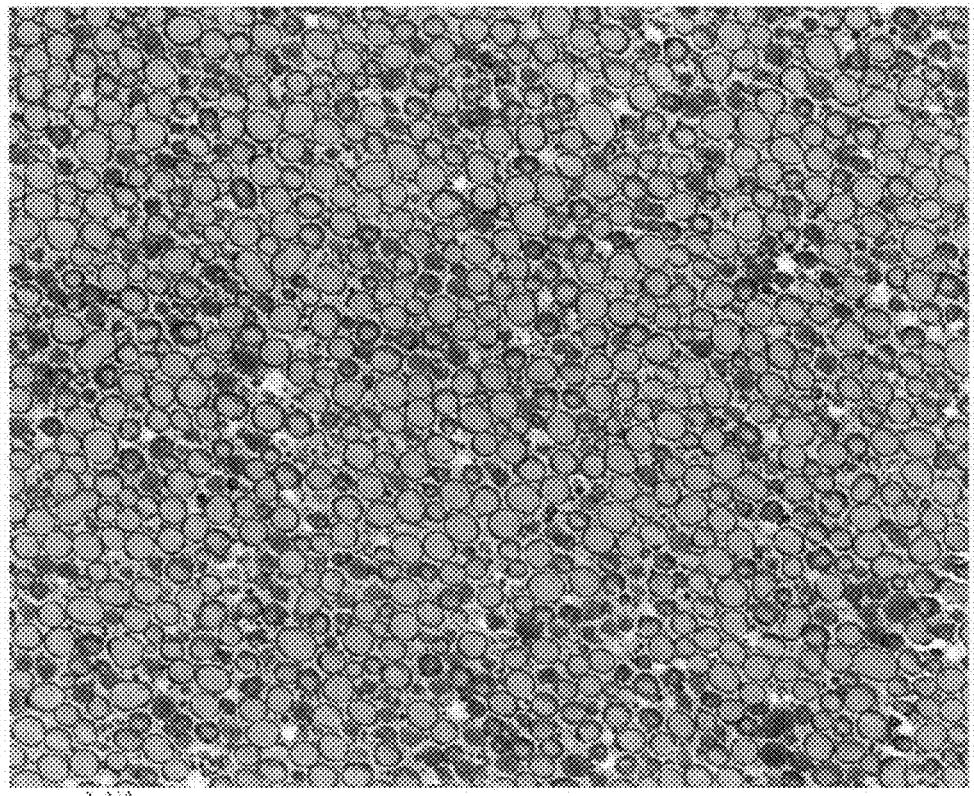
FIG. 4 is a TEM picture showing a center region cross-section of the modified resin bead according to Example 2 of the present invention.

The dispersion state of styrene resin in the obtained modified resin beads was observed by the TEM (×12800). The styrene resin particles with a particle diameter of 0.05 µm to 0.2 µm were dispersed in a surface region (an area within about 5 µm from the surface) and the styrene resin particles with a particle diameter of 0.1 µm to 0.4 µm were dispersed in a center region (an area within about a 5 µm radius from the center). The cross-sectional pictures of the surface region and the center region are shown in FIG. 3 and FIG. 4, respectively.

Figure 5:
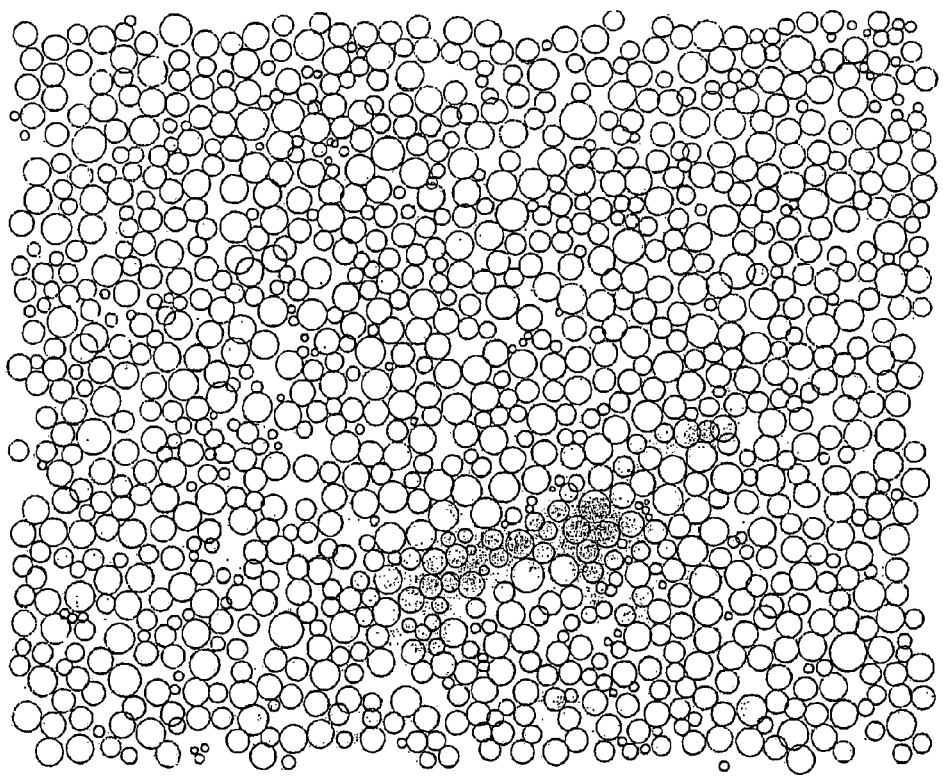
FIG. 5 is a view in which the TEM picture of FIG. 4 is traced.

The diameters of the styrene resin particles in the surface region and the center region were determined as follows. The particles of FIG. 4, for example, were traced as shown in FIG. 5 in such a manner that the areas of the particles in the two figures are substantially equal. The diameter of each particle was measured from the tracing of FIG. 5 and it was confirmed that the particle diameters were in the range of 0.01 µm to 0.4 µm.

Subsequently, 100 parts by weight of the modified resin beads, 1.0 parts by weight of water, 0.15 parts by weight of monoglyceride stearate and 0.5 parts by weight of diisobutyl adipate were fed into a pressure-resistant V-type rotary mixer having a volume of 1 m$^3$, and 14 parts by weight of butane (n-butane: i-butane=7:3) was injected at a normal temperature while the mixer was rotated. After the temperature inside the mixer was raised to 70° C. and kept for 4 hours, it was cooled to 25° C. to obtain expandable beads. The obtained expandable beads had styrene resin particles with a particle diameter of 0.05 µm to 0.2 µm dispersed in a surface region and styrene resin particles with a particle diameter of 0.1 µm to 0.4 µm dispersed in a center region as in the case of the above-mentioned modified resin beads.

The obtained expandable beads were immediately fed into a pre-expanding machine (trade name SKK-70 manufactured by Sekisui Machinery Co., Ltd.) and steam were used at a pressure of 0.02 MPa to pre-expand the beads. Pre-expanded beads having a bulk density of 60 kg/m$^3$ were obtained.

Then, the pre-expanded beads were left standing at a room temperature for 7 days and then filled into a mold of a molding. machine (trade name ACE-3SP manufactured by Sekisui Machinery Co., Ltd.) Steam was introduced into the mold to expand and mold the pre-expanded beads. A rectangular parallelepiped expanded molded article having a size of 400 mm length×300 mm width×50 mm height and a density of 60 kg/m$^3$ was obtained. The fusion rate, compressive strength, and impact and chemical resistance of the obtained molded article were measured. The results are shown in Table 1.

Example 3

0.8 parts by weight of magnesium pyrophosphate and 0.02 parts by weight of sodium dodecylbenzenesulfonate were dispersed in 100 parts by weight of water to obtain a medium for dispersion.

In the dispersion medium, 100.5 parts by weight of the synthetic silicon dioxide containing EVA resin beads of Example 2 was dispersed to obtain a suspension.

Furthermore, 0.19 parts by weight of dicumyl peroxide as a polymerization initiator was dissolved in advance in 40 parts by weight of a styrene monomer to prepare a first styrene monomer.

The temperature of the water-based medium containing the EVA resin beads was adjusted to 60° C. and the styrene monomer was added quantitatively to the medium over 30 min. Then, the resulting mixture was stirred for an hour to impregnate the EVA resin beads with the first styrene. monomer.

Next, the temperature of the reaction system was raised to 130° C. which is higher than the melting point of EVA by 23° C. and kept for 2hours to polymerize (first polymerization) the styrene monomer in the EVA resin beads.

Subsequently, 0.19 parts by weight of dicumyl peroxide as a polymerization initiator was dissolved in 240 parts by weight of a styrene monomer to obtain a second styrene monomer. The second styrene monomer was dropped continuously into the reaction solution of the first polymerization at a rate of 50 parts by weight per hour, so that the second styrene monomer was polymerized (second polymerization) while the EVA resin beads were impregnated with the monomer.

Figure 6:
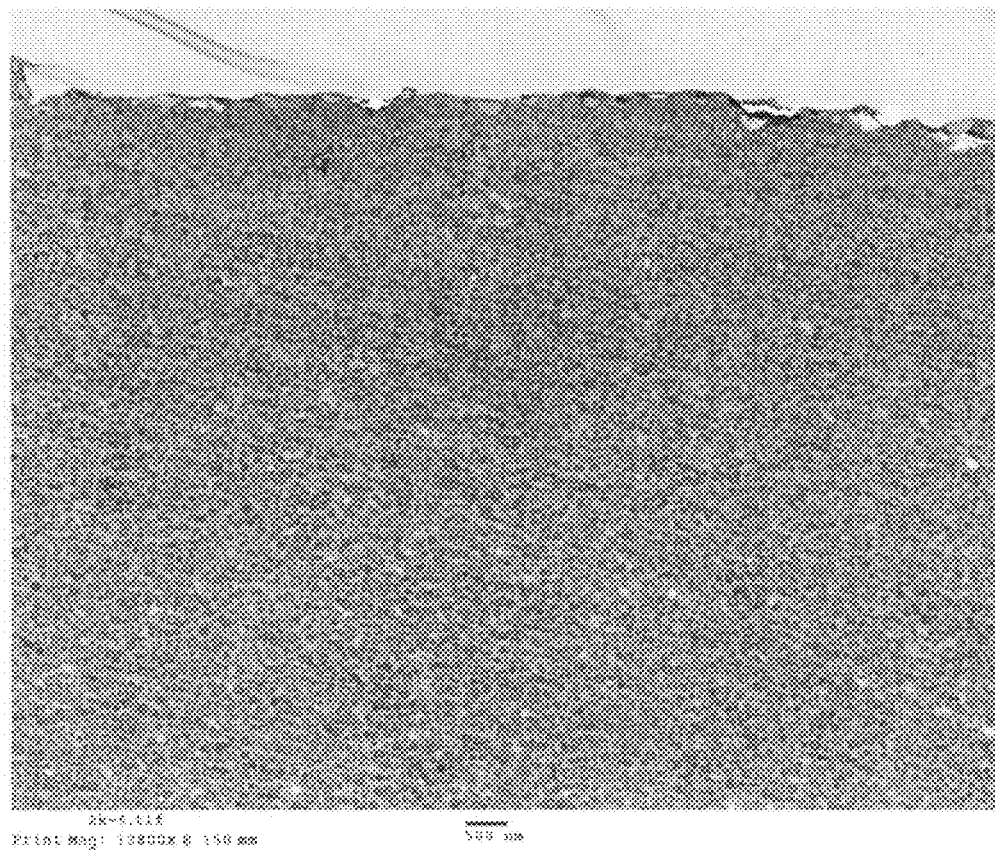
FIG. 6 is a TEM picture showing a surface region cross-section of a modified resin bead according to Example 3 of the present invention.
Figure 7:
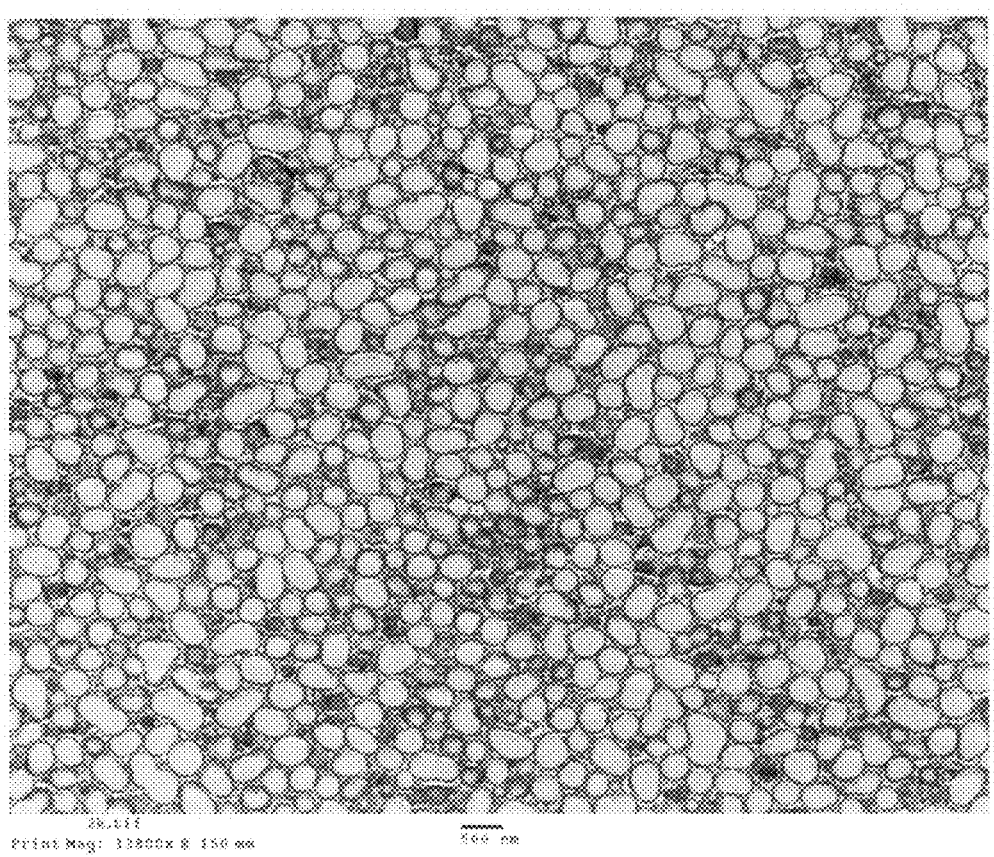
FIG. 7 is a TEM picture showing a center region cross-section of the modified resin bead according to Example 3 of the present invention.

The dispersion state of the styrene resin in the obtained modified resin beads was observed by the TEM (×12800). The styrene resin particles with a particle diameter of 0.05 μm to 0.2 μm were dispersed in a surface region (an area within about 5 μm from the surface) and the styrene resin particles with a particle diameter of 0.1 μm to 0.5 μm were dispersed in a center region (an area within about a 5 μm radius from the center). The cross-sectional pictures of the surface region and the center region are shown in FIG. 6 and FIG. 7, respectively.

100 parts by weight of the modified resin beads, 1.0 parts by weight of water, 0.15 parts by weight of monoglyceride stearate and 0.5 parts by weight of diisobutyl adipate were fed into a pressure-resistant V-type rotary mixer having a-volume of 1 m³, and 16 parts by weight of butane (n-butane: i-butane=7:3) was injected at a normal temperature while the mixer was rotated. After the temperature inside the mixer was raised to 70° C. and kept for 4 hours, it was cooled to 25° C. to obtain expandable beads. The obtained expandable beads had styrene resin particles with a particle diameter of 0.05 μm to 0.2 μm dispersed in a surface region and styrene resin particles with a particle diameter of 0.1 μm to 0.5 μm dispersed in a center region as in the case of the above-mentioned modified resin beads.

The obtained expandable beads were immediately fed into a pre-expanding machine (trade name SKK-70 manufactured by Sekisui Machinery Co., Ltd.) and steam were used at a pressure of 0.02 MPa to pre-expand the beads. Pre-expanded beads having a bulk density of 30 kg/m³ were obtained.

Next, the pre-expanded beads were left standing at a room temperature for 7 days and then filled into a mold of a molding machine (trade name ACE-3SP manufactured by Sekisui Machinery Co., Ltd.) Then, steam was introduced into the mold to expand and mold the pre-expanded beads. A rectangular parallelepiped expanded molded article having a size of 400 mm length×300 mm width×50 mm height and a density of 30 kg/m³ was obtained. The fusion rate, compressive strength, and impact and chemical resistance of the obtained molded article were measured. The results are shown in Table 1.

Example 4

Modified resin beads and expandable beads were obtained in the same manner as in Example 2 except that EVA resin beads were impregnated with 105 parts by weight of a styrene monomer and 5 parts by weight of an α-methyl styrene monomer.

The dispersion states of styrene-based resin in the obtained modified resin beads and expandable beads were observed by the TEM in the same manner as in Example 2. The styrene resin particles with a particle diameter of 0.05 μm to 0.2 μm were dispersed in surface regions and the styrene resin particles with a particle diameter of 0.1 μm to 0.4 μm were dispersed in center regions.

Subsequently, the expansion and molding were performed in the same manner as in Example 2, and the fusion rate, compressive strength, and impact and chemical resistance of the obtained expanded molded article were measured. The results are shown in Table 1.

Example 5

Modified resin beads and expandable beads were obtained in the same manner as in Example 2 except that t-butylperoxy benzoate was used as the initiator and the polymerization temperature was 115° C.

The dispersion states of styrene resin in the obtained modified resin beads and expandable beads were observed by the TEM in the same manner as in Example 2. The styrene resin particles with a particle diameter of 0.05 μm to 0.25 μm were dispersed in surface regions and the styrene resin particles with a particle diameter of 0.1 μm to 0.45 μm were dispersed in center regions.

Subsequently, the expansion and molding were performed in the same manner as in Example 2, and the fusion rate, compressive strength, and impact and chemical resistance of the obtained expanded molded article were measured. The results are shown in Table 1.

Example 6

Modified resin beads were obtained in the same manner as in Example 3 except that the amounts of the first and second styrene monomers were both 100 parts by weight. Then, expandable beads were obtained in the same manner as in Example 2.

The dispersion states of styrene resin in the obtained modified resin beads and expandable beads were observed by the TEM in the same manner as in Example 2. The styrene resin particles with a particle diameter of 0.05 μm to 0.2 μm were dispersed in surface regions and the styrene resin particles with a particle diameter of 0.1 μm to 0.4 μm were dispersed in center regions.

Subsequently, the expansion and molding were performed in the same manner as in Example 2, and the fusion rate, compressive strength, and impact and chemical resistance of the obtained expanded molded article were measured. The results are shown in Table 1.

Example 7

After the first polymerization was carried out in the same manner as in Example 3, the temperature of the reaction system was lowered to 125° C. Then, 0.19 parts by weight of dicumyl peroxide as a polymerization initiator was dissolved in 160 parts by weight of a styrene monomer to obtain a second styrene monomer. The second styrene monomer was dropped continuously into the reaction solution of the first polymerization at a rate of 50 parts by weight per hour, so that the second styrene monomer was polymerized (second polymerization) while the EVA resin beads were impregnated with the monomer. Then, expandable beads were obtained in the same manner as in Example 3.

The dispersion states of styrene resin in the obtained modified resin beads and expandable beads were observed by the TEM in the same manner as in Example 2. The styrene resin particles with a particle diameter of 0.05 µm to 0.2 µm were dispersed in surface regions and the styrene resin particles with a particle diameter of 0.1 µm to 0.4 µm were dispersed in center regions.

Subsequently, the expansion and molding were performed in the same manner as in Example 3, and the fusion rate, compressive strength, and impact and chemical resistance of the obtained expanded molded article were measured. The results are shown in Table 1.

Example 8

The same EVA as the one in Example 2 was used as the polyethylene-based resin. 100 parts by weight of the EVA, 3 parts by weight of carbon black particles and 0.5 parts by weight of talc were fed into an extruder. The feedstock was melted and kneaded, and then granulated by under-water cut system to provide oval (egg-shaped) black-colored polyethylene-based resin beads.

Modified resin beads and expandable beads were obtained in the same manner as in Example 7 except that the black-colored polyethylene-based resin beads were used.

The dispersion states of styrene resin in the obtained modified resin beads and expandable beads were observed by the TEM in the same manner as in Example 2. The styrene resin particles with a particle diameter of 0.05 µm to 0.2 µm were dispersed in surface regions and the styrene resin particles with a particle diameter of 0.1 µm to 0.4 µm were dispersed in center regions.

Subsequently, the expansion and molding were performed in the same manner as in Example 3, and the fusion rate, compressive strength, and impact and chemical resistance of the obtained expanded molded article were measured. The results are shown in Table 1.

Example 9

Modified resin beads were obtained in the same manner as in Example 7, and 12 parts by weight of pentane (n-pentane: isopentane=80:20) was added instead of butane as the blowing agent. The temperature inside the rotary mixer was raised to 30° C. and kept for 6 hours. Then, the temperature was cooled to 25° C. to obtain expandable beads.

The dispersion states of styrene resin in the obtained modified resin beads and expandable beads were observed by the TEM in the same manner as in Example 2. The styrene resin particles with a particle diameter of 0.05 µm to 0.2 µm were dispersed in surface regions and the styrene resin particles with a particle diameter of 0.1 µm to 0.4 µm were dispersed in center regions.

Using the obtained expandable beads, the expansion and molding were performed in the same manner as in Example 3, and the fusion rate, compressive strength, and impact and chemical resistance of the obtained expanded molded article were measured. The results are shown in Table 1.

Comparative Example 1

Modified resin beads were obtained in the same manner as in Example 2 except that the amount of styrene monomer added was 10 parts by weight.

Figure 8:
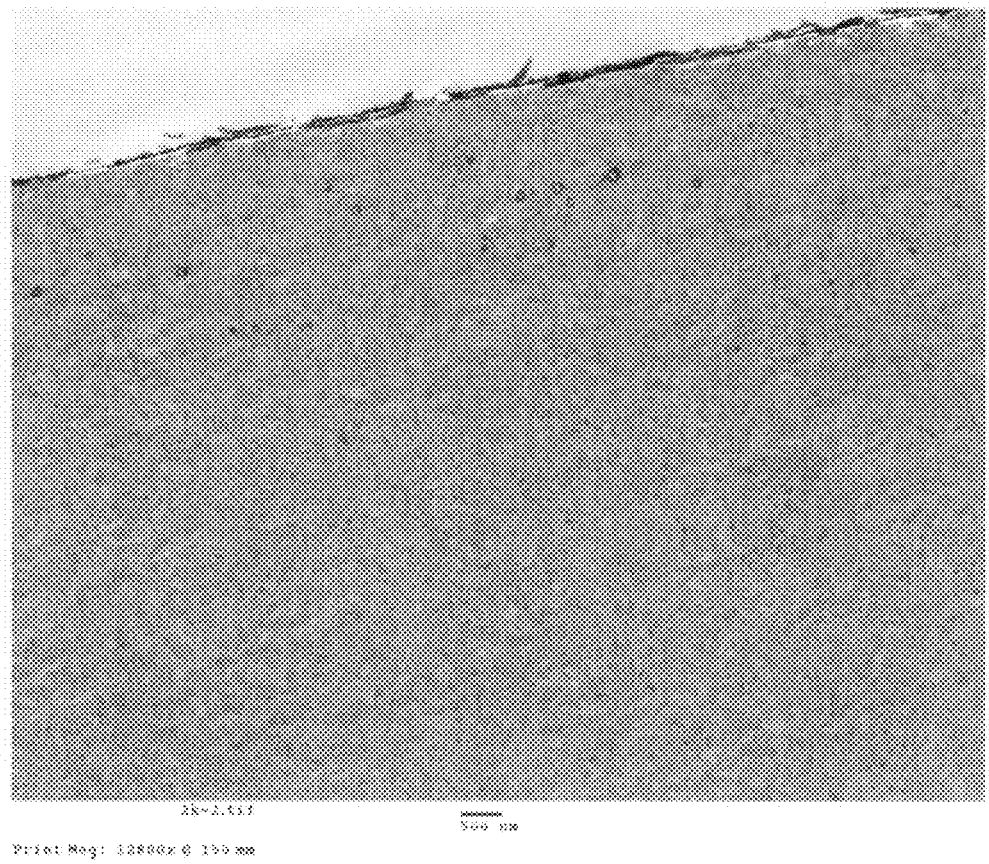
FIG. 8 is a TEM picture showing a surface region cross-section of a modified resin bead according to Comparative Example 1.
Figure 9:
FIG. 9 is a TEM picture showing a center region cross-section of the modified resin bead according to Comparative Example 1.

The dispersion state of styrene resin in the obtained modified resin beads was observed by the TEM (×12,800) and dispersion of the styrene resin particles was hardly observed in both surface and center regions. The cross-sectional pictures of the surface region and the center region are shown in FIG. 8 and FIG. 9, respectively.

Then, resin beads containing a blowing agent (blowing agent-containing resin beads) were obtained in the same manner as in Example 1. The dispersion state of styrene resin in the obtained blowing-agent containing resin beads was observed in the same manner as described above, and dispersion of the styrene resin particles was hardly observed in both surface and center regions as in the case of the above modified resin beads.

The obtained blowing agent-containing resin beads were immediately fed into a pre-expanding machine (trade name SKK-70 manufactured by Sekisui Machinery Co., Ltd.) and steams were used at a pressure of 0.02 MPa to pre-expand the beads. The beads, however, hardly expanded and pre-expanded beads that can be adapted for expansion molding could not be obtained.

Comparative Example 2

Modified resin beads were obtained in the same manner as in Example 3 except that the amount of styrene monomer in the second styrene monomer was 260 parts by weight.

Figure 10:
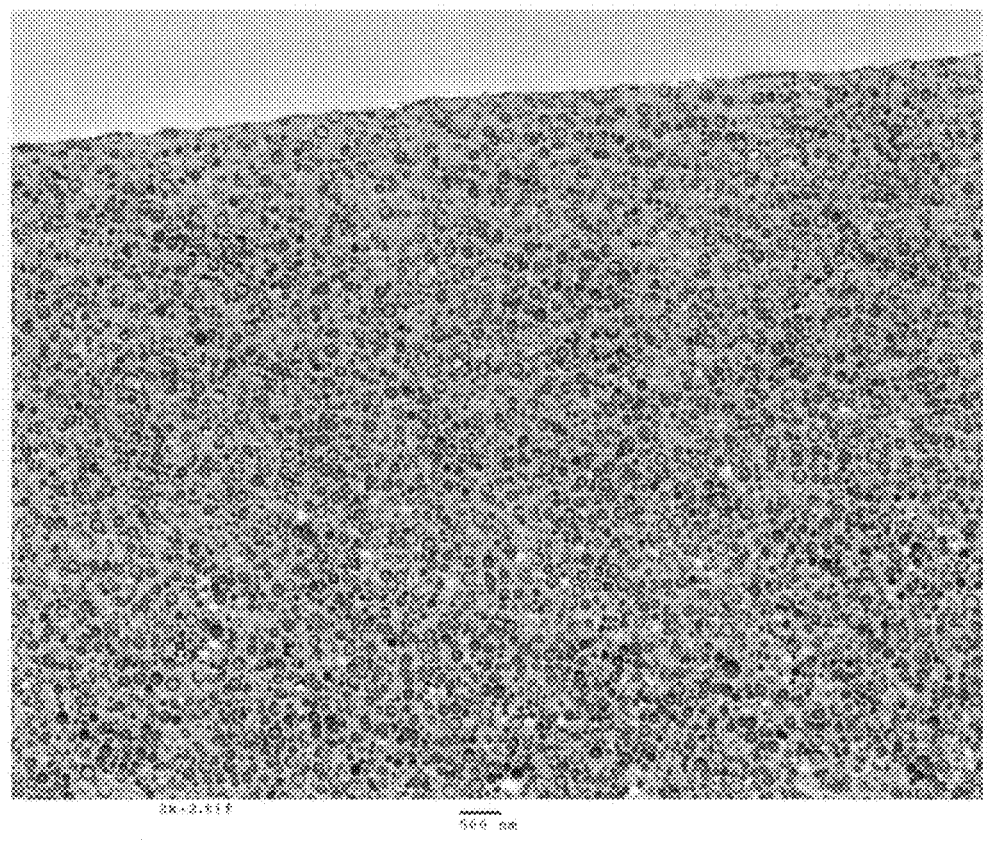
FIG. 10 is a TEM picture showing a surface region cross-section of a modified resin bead according to Comparative Example 2.
Figure 11:
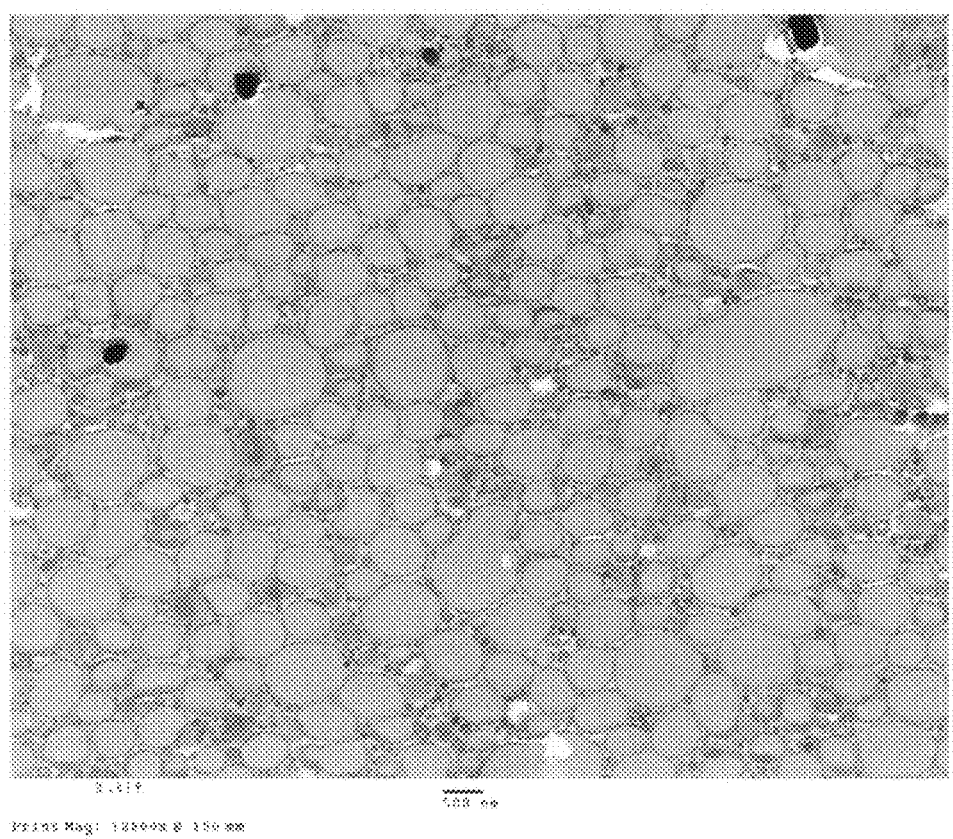
FIG. 11 is a TEM picture showing a center region cross-section of the modified resin bead according to Comparative Example 2.

The dispersion state of styrene resin in the obtained modified resin beads was observed by the TEM (×12,800). The styrene resin particles with a particle diameter of 0.05 µm to 0.2 µm were dispersed in a surface region (an area within about 5 µm from the surface) and the styrene resin particles with a particle diameter of 1 µm or greater were dispersed in a center region (an area within about a 5 µm radius from the center). The cross-sectional pictures of the surface region and the center region are shown in FIG. 10 and FIG. 11, respectively.

Then, expandable beads were obtained in the same manner as in Example 3. The obtained expandable beads had the styrene resin particles with a particle diameter of 0.05 µm to 0.2 µm dispersed in a surface region and the styrene resin particles with a particle diameter of 1 µm or greater dispersed in a center region as in the case of the above modified resin beads.

The obtained expandable beads were immediately fed into a pre-expanding machine (trade name "SKK-70" manufactured by Sekisui Machinery Co., Ltd.) and steam were used at a pressure of 0.02 MPa to pre-expand the beads. Pre-expanded beads having a bulk density of 30 kg/m³ were obtained.

Next, the pre-expanded beads were left standing at a room temperature for 7 days and filled into a mold of a molding machine (trade name ACE-3SP manufactured by Sekisui Machinery Co., Ltd.) Then, steam was introduced into the mold to expand and mold the pre-expanded beads. A rectangular parallelepiped expanded molded article having a size of 400 mm length×300 mm width×50 mm height and a density of 30 kg/m³ were obtained. The fusion rate, compressive strength, and impact and chemical resistance of the obtained molded article were measured. The results are shown in Table 2.

Comparative Example 3

Modified resin beads were obtained in the same manner as in Example 3 except that the first and second. polymerization temperatures were 85° C.

Figure 12:
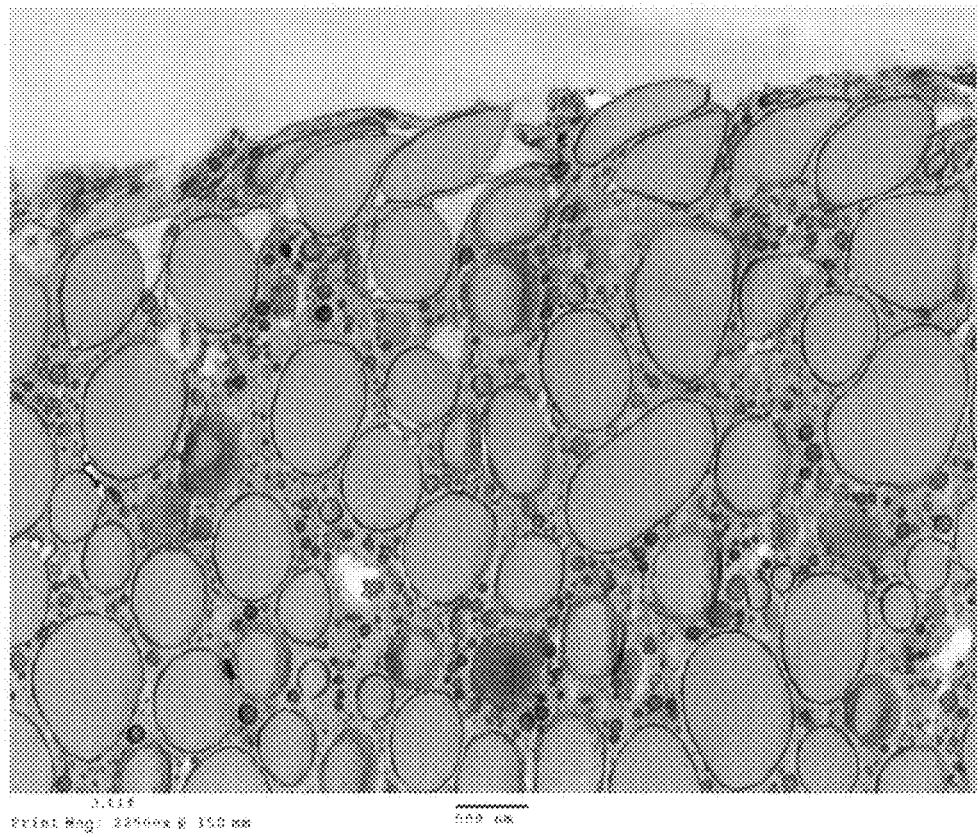
FIG. 12 is a TEM picture showing a surface region cross-section of a modified resin bead according to Comparative Example 3.
Figure 13:
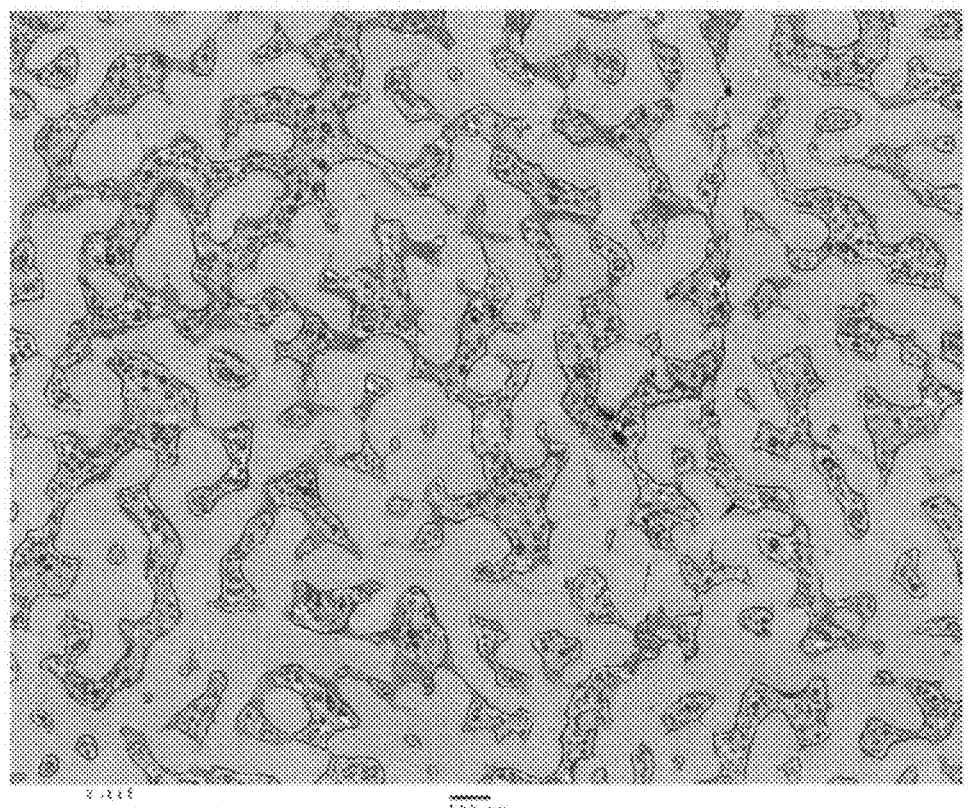
FIG. 13 is a TEM picture showing a center region cross-section of the modified resin bead according to Comparative Example 3.

The dispersion state of styrene resin in the obtained modified resin beads was observed by the TEM (×22,500 in a surface region, ×12,800 in a center region). The styrene resin particles with a particle diameter greater than 1 μm were dispersed in the surface region (an area within about 5 μm from the surface), and in the center region (an area within about 5 μm radius from the center), the styrene resin particles were not observed in particulate form and instead, were in a continuous state. The cross-sectional pictures of the surface region and the center region are shown in FIG. 12 and FIG. 13, respectively.

Then, expandable beads were obtained in the same manner as in Example 3. The obtained expandable beads had the styrene resin particles with a particle diameter greater than 1 μm dispersed in a surface region as in the case of the above modified resin beads. In a center region, the styrene resin particles were not observed in particulate form and instead, were in a continuous state.

The obtained expandable beads were immediately fed into a pre-expanding machine (trade name SKK-70 manufactured by Sekisui Machinery Co., Ltd.) and steam were used at a pressure of 0.02 MPa to pre-expand the beads. Pre-expanded beads having a bulk density of 30 kg/m$^3$ were obtained.

Next, the pre-expanded beads were left standing at a room temperature for 7 days and filled into a mold of a molding machine (trade name ACE-3SP manufactured by Sekisui Machinery Co., Ltd.) Then, steam was introduced into the mold to expand and mold the pre-expanded beads. A rectangular parallelepiped expanded molded article having a size of 400 mm length×300 mm width×50 mm height and a density of 30 kg/m$^3$ was obtained. The fusion rate, compressive strength, and impact and chemical resistance of the obtained molded article were measured. The results are shown in Table 2.

Comparative Example 4

Modified resin beads and expandable beads were obtained in the same manner as in Example 3 except that synthetic silicon dioxide was not added at the granulation of the EVA resin beads.

Figure 14:
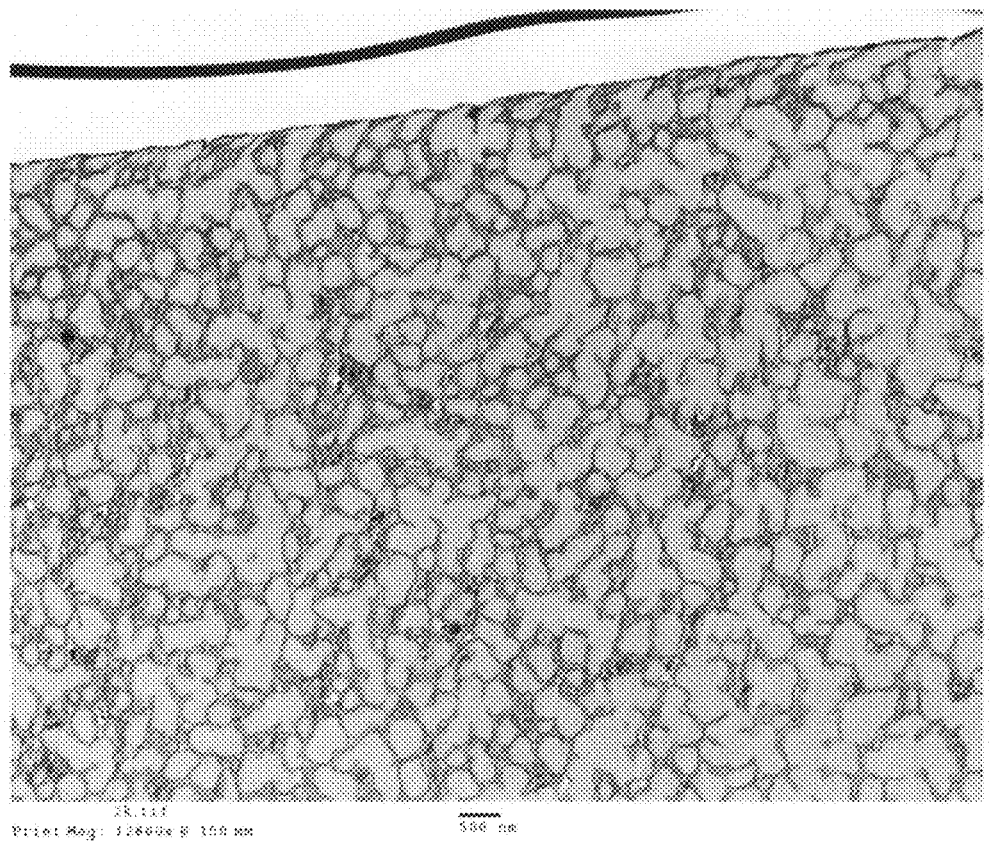
FIG. 14 is a TEM picture showing a surface region cross-section of a modified resin bead according to Comparative Example 4.
Figure 15:
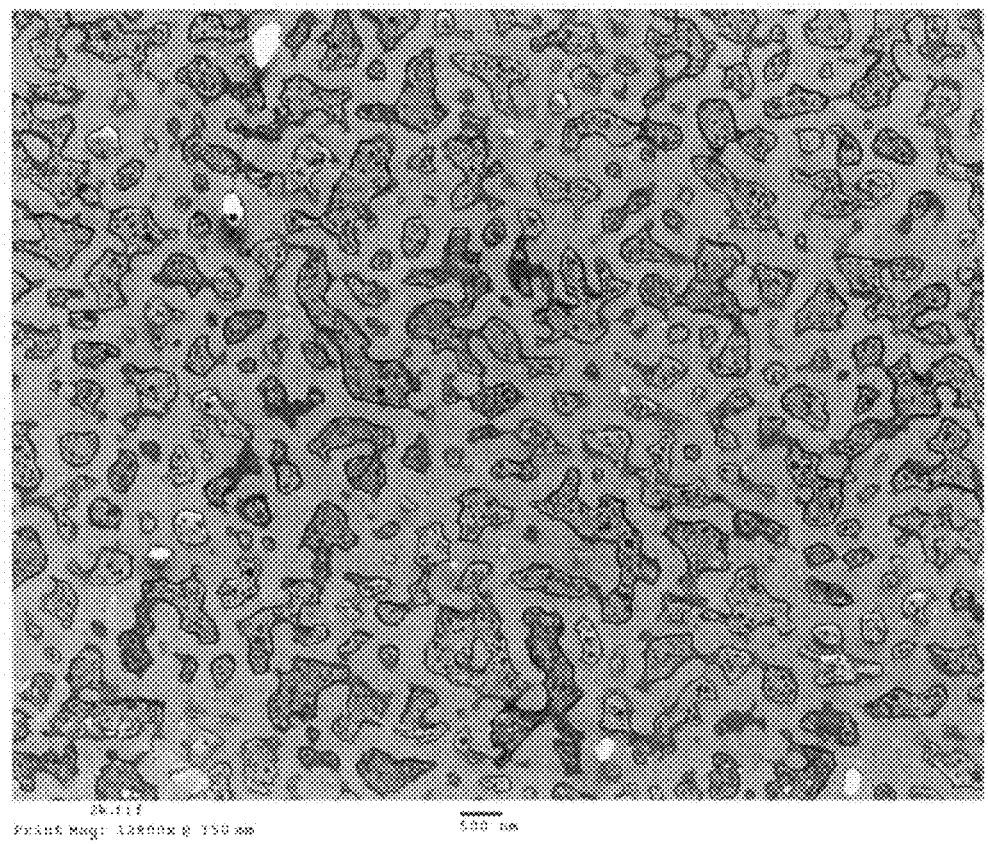
FIG. 15 is a TEM picture showing a center region cross-section of the modified resin bead according to Comparative Example 4.

The dispersion states of styrene resin in the obtained modified resin beads and expandable beads were observed by the TEM (×12,800). The styrene resin particles coalesced and were in a continuous state in surface and center regions. The cross-sectional pictures of the surface region and the center region of the modified resin beads are shown in FIG. 14 and FIG. 15, respectively.

The obtained expandable beads were subjected to pre-expansion and expansion molding in the same manner as in Example 3 to make an expanded molded article having a density of 30 kg/m$^3$. The bulk density of the obtained pre-expanded beads, and the fusion rate, compressive strength, and impact and chemical resistance of the obtained molded article were measured. The results are shown in Table 2.

Comparative Example 5

Modified resin beads and expandable beads were obtained in the same manner as in Example 2 except that benzoyl peroxide was used as the initiator and the polymerization temperature was 97° C.

The dispersion states of styrene resin in the obtained modified resin beads and expandable beads were observed by the TEM in the same manner as in Example 2. The styrene resin particles with a particle diameter greater than 1 μm were dispersed in surface regions (areas within about 5 μm from the surfaces). The styrene resin particles coalesced and were in a continuous state in center regions (areas within about 5 μm radius from the centers)

Then, expansion and molding were performed in the same manner as in Example 2, and the fusion rate, compressive strength, and impact and chemical resistance of the obtained expanded molded article were measured. The results are shown in Table 2.

Comparative Example 6

Modified resin beads and expandable beads were obtained in the same manner as in Example 7 except that benzoyl peroxide was used as the initiator and the polymerization temperature was 85° C. in the second polymerization.

Figure 16:
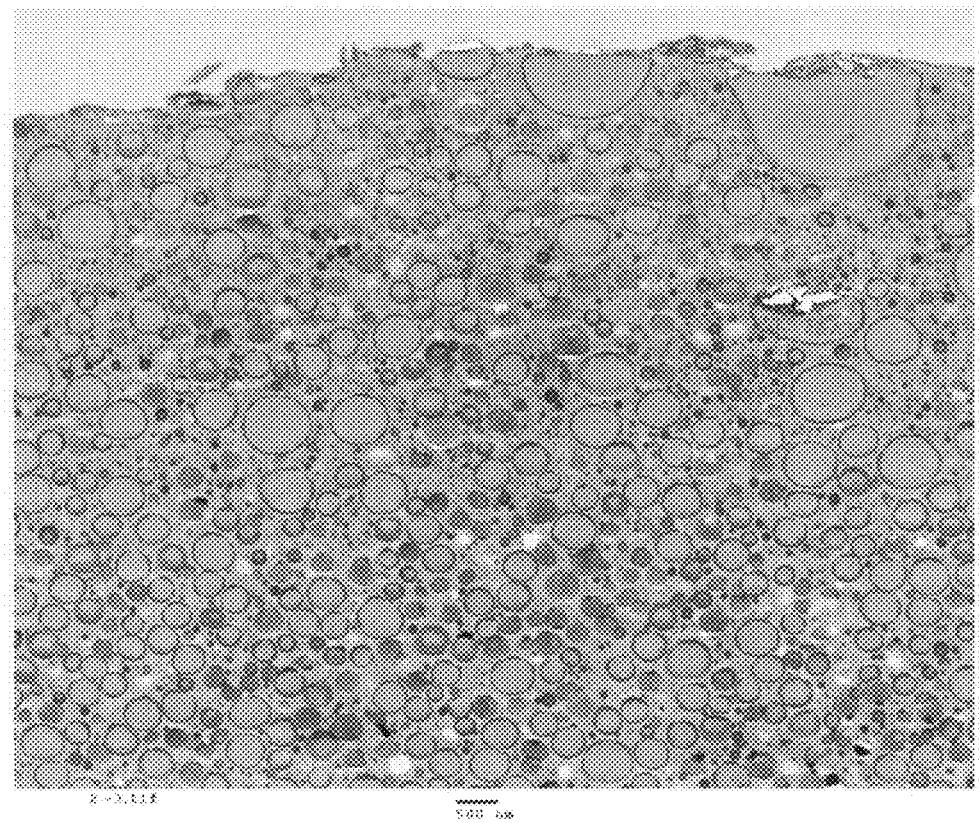
FIG. 16 is a TEM picture showing a surface region cross-section of a modified resin bead according to Comparative Example 6.
Figure 17:
FIG. 17 is a TEM picture showing a center region cross-section of the modified resin bead according to Comparative Example 6.

The dispersion states of styrene resin in the obtained modified resin beads and expandable beads were observed by the TEM in the same manner as in Example 2. The styrene resin particles with a particle diameter greater than 1 μm were dispersed in surface regions (areas within about 5 μm from the surfaces). The styrene resin particles were-in a continuous state in center regions (areas within about a 5 μm radius from the centers). The cross-sectional pictures of the surface region and the center region of the modified resin beads are shown in FIG. 16 and FIG. 17, respectively.

Then, the expansion and molding were performed in the same manner as in Example 3, and the fusion rate, compressive strength, and impact and chemical resistance of the obtained expanded molded article were measured. The results are shown in Table 2.

Comparative Example 7

Modified resin beads and expandable beads were obtained in the same manner as in Example 7 except that benzoyl peroxide was used as the initiator and the polymerization temperature was 85° C. in the first polymerization and dicumyl peroxide was used as the initiator and the polymerization temperature was 125° C. in the second polymerization.

The dispersion states of styrene resin in the obtained modified resin beads and expandable beads were observed by the TEM in the same manner as in Example 2. The styrene resin particles with a particle diameter greater than 1 μm were dispersed in surface regions (areas within 5 μm from the surfaces) and center regions (areas within about a 5 μm radius from the centers).

Then, the expansion and molding were performed in the same manner as in Example 3, and the fusion rate, compressive strength, and impact and chemical resistance of the obtained expanded molded article were measured. The results are shown in Table 2.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Conditions | PE Resin(pbw) | LDPE100 | EVA100 | EVA100 | EVA100 | EVA100 | EVA100 | EVA100 | EVA100 | EVA100 |
| | Coloring Agent(pbw) | | | | | | | | CB3 | |
| | Melting Point(° C.) | 112 | 107 | 107 | 107 | 107 | 107 | 107 | 107 | 107 |
| | Inorg. Nucleating Agent(pbw) | 0.5 | 0.5 | 0.5 | 0.5 | 0.5 | 0.5 | 0.5 | 0.5 | 0.5 |
| | 1st. Styrene-based Monomer (pbw) | SM 30 | SM 110 | SM 40 | SM + α MSM 105 + 5 | SM 110 | SM 100 | SM 40 | SM 40 | SM 40 |
| | 2nd. Styrene-based Monomer(pbw) | | | SM240 | | | SM100 | SM160 | SM160 | SM160 |
| | 1st. Polym. Temp. (° C.) | 130 | 130 | 130 | 130 | 115 | 130 | 130 | 130 | 130 |
| | 2nd. Polym. Temp. (° C.) | | | 130 | | | 130 | 125 | 125 | 125 |
| Blowing Agent | | Butane | Butane | Butane | Butane | Butane | Butane | Butane | Butane | Pentane |
| Bulk Density(kg/cm³) | | 60 | 60 | 30 | 60 | 60 | 60 | 30 | 30 | 30 |
| Fusion Rate (%) | | 90 | 90 | 90 | 90 | 90 | 90 | 90 | 90 | 90 |
| Compressive Strength (kPa) | | 300 | 350 | 300 | 340 | 350 | 320 | 280 | 280 | 280 |
| Impact Resistance(cm) | | 110.5 | 120.5 | 65.5 | 118.5 | 120.5 | 115.5 | 70.5 | 69.5 | 70.5 |
| Chemical Resistance | Gasolin | ○ | ○ | ○ | ○ | ○ | ○ | ○ | ○ | ○ |
| | Kerosene | ○ | ○ | ○ | ○ | ○ | ○ | ○ | ○ | ○ |
| | DBP | ○ | ○ | ○ | ○ | ○ | ○ | ○ | ○ | ○ | pbw: parts by weight

TABLE 2

| | | Comparative Examples | | | | | | |
|---|---|---|---|---|---|---|---|---|
| | | 1 | 2 | 3 | 4 | 5 | 6 | 7 |
| Conditions | PE Resin (pbw) | EVA100 | EVA100 | EVA100 | EVA100 | EVA100 | EVA100 | EVA100 |
| | Melting Point (° C.) | 107 | 107 | 107 | 107 | 107 | 107 | 107 |
| | Inorg. Nucleating Agent (pbw) | 0.5 | 0.5 | 0.5 | 0 | 0.5 | 0.5 | 0.5 |
| | 1st. Styrene-based Monomer (pbw) | SM 10 | SM 40 | SM 40 | SM 40 | SM 110 | SM 40 | SM 40 |
| | 2nd. Styrene-based Monomer (pbw) | | SM 260 | SM 240 | SM 240 | | SM 160 | SM 160 |
| | 1st. Polym. Temp. (° C.) | 130 | 130 | 85 | 130 | 97 | 130 | 85 |
| | 2nd. Polym. Temp. (° C.) | | 130 | 85 | | | 85 | 125 |
| Blowing Agent | | Butane | Butane | Butane | Butane | Butane | Butane | Butane |
| Bulk Density (kg/cm³) | | | 30 | 30 | 30 | 60 | 30 | 30 |
| Fusion Rate (%) | | | 90 | 80 | 40 | 85 | 80 | 80 |
| Compressive Strength (kPa) | | | 320 | 300 | 300 | 350 | 280 | 280 |
| Impact Resistance (cm) | | | 52.5 | 35.5 | 10.5 | 90.5 | 42.5 | 50.5 |
| Chemical Resistance | Gasoline | | ○ | X | X | X | X | Δ |
| | Kerosene | | ○ | Δ | X | Δ | Δ | Δ |
| | DBP | | ○ | Δ | X | Δ | Δ | Δ | pbw: parts by weight

In Tables 1 and 2, PE refers to polyethylene-based resin, SM refers to a styrene monomer and α-MSM refers to an α-methylstyrene monomer.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

Furthermore, the present invention is related to Japanese Patent Application No. 2004-257154 filed on Sep. 3, 2004, whose priory is claimed and the disclosure of which is incorporated by reference in its entirety.

The invention claimed is:

1. Styrene-modified polyethylene-based resin particles, wherein the particles comprise from 20 parts by weight to less than 300 parts by weight of styrene-based resin relative to 100 parts by weight of polyethylene-based resin that contains an inorganic nucleating agent and has a melting point of 95° C. to 115° C., and wherein the styrene-based resin is dispersed in a form of particles in polyethylene-based resin particles, a particle diameter of a styrene-based resin particle being 0.8 µm or smaller both in a surface region within at least 5 µm. from a surface of a modified resin particle and in a center region of a modified resin particle.

2. The styrene-modified polyethylene-based resin particles of claim 1, wherein a particle diameter of a styrene-based resin particle is from about 0.01 μm to 0.8 μm both in the surface region and the center region of a modified resin particle.

3. The styrene-modified polyethylene-based resin particles of claim 1, wherein the particles comprise a volatile blowing agent.

4. Pre-expanded resin particles, wherein the particles have a bulk density of from 10 to 300 kg/m$^3$ and are obtained by pre-expanding the styrene-modified polyethylene-based expandable resin particles of claim 3.

5. An expanded molded article, wherein the article has a density of from 10 to 300 kg/m$^3$ and is obtained by expansion molding of the pre-expanded resin particles of claim 4.

\* \* \* \* \*